Figure 1:
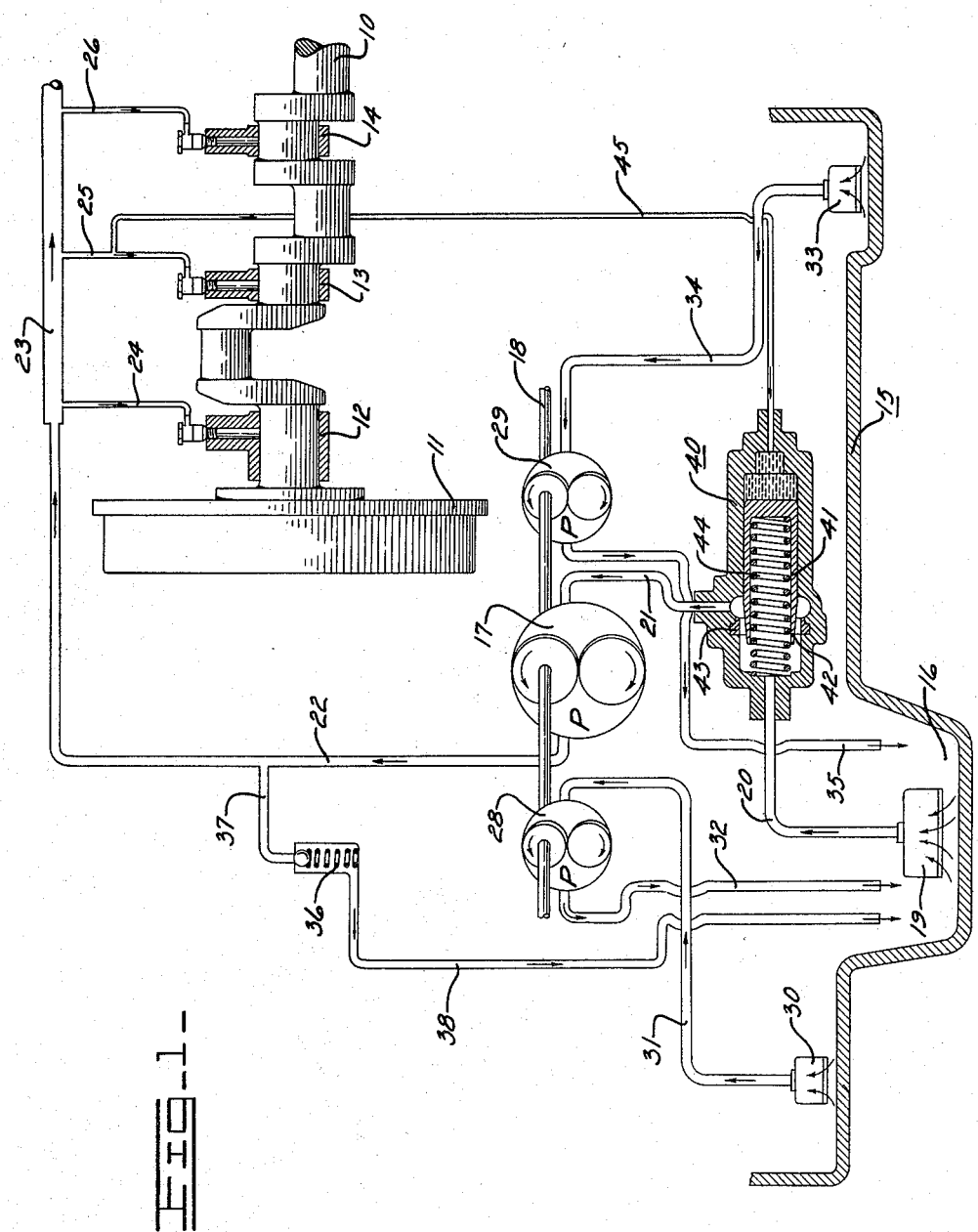

May 1, 1951 G. E. BURKS ET AL 2,550,967
MOTOR LUBRICATION

Filed June 4, 1945 2 Sheets-Sheet 1

INVENTORS.
George E. Burks
BY Ronald R. Robinson
Charles M. Fryer
ATTORNEY

May 1, 1951  G. E. BURKS ET AL  2,550,967
MOTOR LUBRICATION
Filed June 4, 1945  2 Sheets-Sheet 2
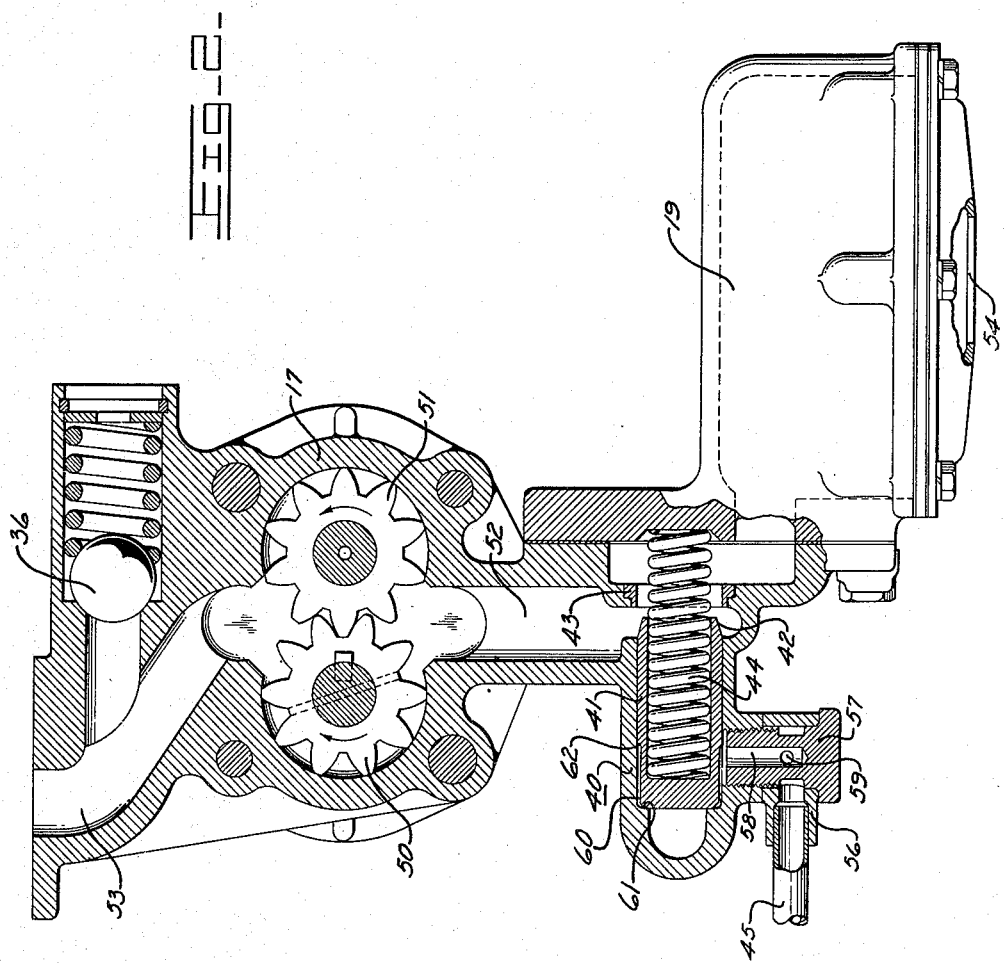
INVENTORS.
George E. Burks
BY Ronald R. Robinson
Charles M. Fryer
ATTORN.

Patented May 1, 1951

2,550,967

UNITED STATES PATENT OFFICE 2,550,967

MOTOR LUBRICATION

George E. Burks, Peoria, and Ronald R. Robinson, Morton, Ill., assignors to Caterpillar Tractor Co., San Leandro, Calif., a corporation of California Application June 4, 1945, Serial No. 597,528

4 Claims. (Cl. 184—6)

The present invention relates to motor lubrication and particularly to a lubricating system for internal combustion engines and the like.

In most internal combustion engines, lubrication of bearings and other moving parts is accomplished by providing a supply of lubricant in a reservoir such as the crankcase of the engine and pumping lubricant from this reservoir through suitable conduits to the parts to be lubricated. The lubricant drains back to the crankcase from the various points at which it is discharged and is thus constantly circulated to the bearing surfaces by the pump. It is common practice to employ a positive displacement type pump for circulating lubricant and to drive the pump by connection with rotating parts of the engine such, for example, as the camshaft. As a result of this practice, the speed of the pump is determined by the speed of the engine and the supply of lubricant to the bearings is not uniform but varies greatly with engine speeds. At high speeds the engine operates the pump at capacities far in excess of the lubrication requirements of the bearings. This is undesirable because it results in agitation and churning of the lubricant to the extent that it becomes foamy and includes a considerable quantity of air in emulsion which greatly increases its bulk and reduces its efficiency as a lubricant.

Some attempts have been made to relieve the pressure and agitation of lubricating oil in systems of this kind and such attempts include the provision of a pressure relief valve in the system of distributing conduits at the discharge side of the pump. This has the advantage of reducing the pressure in the distributing conduits and at the bearings but it does not overcome the principal cause of agitation of the oil which is the high volume operation of the pump.

It is an object of the present invention to overcome the above described disadvantages in motor lubrication and to provide a method of distributing lubricant and a lubricating system wherein a predetermined maximum of lubricant is directed to bearings and other parts to be lubricated and wherein no more than a necessary quantity of lubricant is directed through or subjected to the churning and agitating action of the lubricant pump. Another object of the invention is the provision of a motor lubricating system having a pump driven by motor operation but including means to limit the quantity of lubricant supplied to the intake of the pump regardless of its speed of operation and in accordance with the requirements of the bearings to be lubricated. A still further object of the invention is the provision of a motor lubricating system having means to limit the delivery of the lubricant to bearing surfaces under ordinary operating conditions and other means to insure adequate lubrication of the bearings upon starting of the motor when the lubricant is cold and therefore unusually viscous and difficult to circulate.

Further and more specific objects and advantages of the invention are made apparent in the following specification wherein reference is made to the accompanying drawings.

In the drawings:

Fig. 1 is a diagrammatic view of a motor lubricating system embodying the principles of the present invention; and Fig. 2 is a vertical sectional view through a lubricating pump such as may be used in the system shown in Fig. 1 and also illustrating a modified type of a control valve shown in Fig. 1.

While there are many parts in an internal combustion engine which must be supplied with lubricant, the main bearings of the crankshaft are generally considered the most critical and the present invention is therefore illustrated and described in connection with the supply of lubricant to such bearings though it will be understood as the description proceeds that these bearings are taken as typical for purposes of illustration.

In Fig. 1 of the drawings the crankshaft of an internal combustion engine is indicated at 10 as having the usual fly wheel 11 and as having conventional crankshaft bearings indicated at 12, 13 and 14. The pan, or bottom of the crankcase housing, is diagrammatically illustrated at 15 and is shown as having a depression or sump 16 which serves to retain a supply of oil to be delivered to the bearings of the engine such as those typified at 12, 13 and 14. A pump 17 is connected with and driven by a rotating shaft 18 which may be the camshaft or any other rotating part of the engine from which a pump drive may conveniently be taken. The pump 17 withdraws oil from the sump 16 through a conventional strainer 19 and through intake pipes 20 and 21 and discharges the same through a discharge pipe 22 which communicates with a manifold 23. Branch pipes 24, 25 and 26 communicate between the manifold 23 and the bearings 12, 13 and 14, respectively, and in a conventional manner so that oil withdrawn from the sump 16 is constantly supplied to the bearing surfaces in need of lubrication. Excess oil from the bearings drips back into the crankcase 15 and is returned to the sump 16. In the event that any substantial quantity of oil collects at either end of the crankcase, as might be occasioned by tilting of the engine as where a vehicle driven by the engine is traveling up or down hill, auxiliary or scavenging pumps may be employed to return such accumulation of oil to the sump. Such pumps are illustrated for example at 28 and 29 as also being driven by the camshaft 18. The pump 28 is arranged to withdraw oil from one end of the crankcase through a filter 30 and an intake pipe 31 and to direct such oil through a discharge pipe 32 which leads into the sump 16. The pump 29 has a corresponding filter 33, intake line 34 and discharge line 35.

It is undesirable to deliver oil to the bearings 12, 13 and 14 and to other bearing surfaces at excessive pressures because the presence of high pressure in such a system requires unnecessarily strong tubing and connections to prevent bursting and also because the circulation of large quantities of oil through a pump and distributing system results in undesirable agitation and foaming of the oil. In order to prevent excessive pressures in the distributing system, pressure relief valves have heretofore been employed on the discharge side of the main pump 17. Such valves are somewhat in the nature of that shown at 36 in Fig. 1 wherein a spring loaded check valve is shown as communicating with the discharge line 22 through a pipe 37 and having a return line 38 for by-passing the relieved oil to the sump 16. Such a valve was previously relied upon as the only means for controlling the pressure in the distributing system and the pump in such cases always delivered its full capacity depending upon the speed of operation of the motor. Consequently, when the motor was operated at high speeds, the pump was handling several times the actual volume and pressure of oil required at the surfaces to be lubricated with the excess volume and pressure being relieved through a valve like that shown at 36.

In the present invention, the valve 36 is used only as a safety device to relieve pressure in the distributing system in the event of failure of some other part. The quantity of oil delivered by the pump 17 to the bearing surfaces is constantly regulated by a pressure actuated control valve shown at 40 disposed on the intake side of the pump 17 and connected between the conduits 20 and 21. The valve 40 regulates the amount of oil flowing to the pump 17 from the sump 16 and is operated in response to pressure of oil in the distributing system and preferably at a point adjacent the bearing surfaces. For example, the valve 40 is shown as a cylindrical housing with a reciprocal plunger 41 having a tapered end 42 cooperating with a valve orifice which is defined by an annular insert 43. A spring 44 normally urges the plunger 41 toward its full open position where the small end of the taper 42 cooperates with the control orifice to permit a relatively large flow of oil through the intake side of the pump 17. A conduit 45 communicates with the valve housing 40 to communicate pressure to the plunger 41 therein in opposition to the pressure of the spring 44. This conduit leads to a point in the distributing system adjacent the bearing surfaces to which oil is being supplied as shown, for example, in the drawing where the conduit 45 communicates with the branch pipe 25 leading to one of the main crankshaft bearings. Consequently, the pressure in the distributing system adjacent the points to which lubrication is being supplied is transmitted to the valve housing 40 and opposes the action of the spring 44 in positioning the plunger 41 to control the supply of lubricant to the pump 17. The pump is therefore permitted to pick up and direct to the surfaces to be lubricated only the quantity of oil necessary to supply the required volume and pressure at said surfaces, even though it may be operated at high speeds which would normally effect pumping and agitation of several times the required quantity of oil. In the event of any failure of the valve 40 to restrict the flow of oil to the intake side of the pump, the valve 36 will function to relieve accidental excessive pressure in the distributing conduits.

Under some conditions of engine operation such, for example, as starting in cold weather when the lubricant in the engine becomes viscous and difficult to circulate, it is desirable to direct a greater than normal supply of lubricant into the distributing system. To accomplish this a modified form of valve 40 may be employed and such modification is illustrated in Fig. 2 wherein the pump 17, filter 19 and valve 40 are illustrated in a typical practical arrangement. In this view the pump is shown with conventional gear type pumping members 50 and 51 and with an intake passage 52 and a discharge passage 53 with which is associated the spring loaded pressure relief valve 36 described in connection with Fig. 1. The filter 19 is shown as a housing with an inlet 54 in its bottom and is directly connected with the intake portion of the pump housing. The filter may contain any suitable type of oil filtering unit conventionally used for this purpose. The valve housing 40 is shown as formed integrally with the intake passage of the pump and contains the plunger 41 with a tapered end 42 registering with the control orifice insert 43 and biased by spring 44, all operating in the manner described in connection with the valve and corresponding parts illustrated in Fig. 1. In this modification, however, the conduit 45 which communicates with the distributing system to transmit pressure to the plunger 41 in opposition to the pressure exerted by the spring 44 is connected with the side of the housing 40, rather than to its end. This connection is made by an adapter 56 secured in place by a threaded screw 57 which is centrally bored as at 58 and radially bored as at 59 to communicate oil pressure to the side of the plunger 41. Adjacent the end at which liquid pressure is applied the plunger 41 is slightly reduced in diameter as indicated at 60 and its face at the same end seats against a shoulder 61 which prevents pressure entering through the conduit 45 and fitting 57 from being exerted against the plunger in opposition to the spring 44. Consequently, upon cold starting of an engine when the oil is highly viscous the pressure directed to the side walls of the plunger 41 at its reduced diameter 60 will not effect its movement in opposition to the spring 44 and the pump will receive and deliver to the distributing system its full capacity of oil, the pressure being relieved only by the relief valve 36. After a period of motor operation sufficient to warm the oil and reduce its viscosity, the pressure of the oil which surrounds the plunger 41 at its reduced portion 60 will become sufficiently great to start a forward movement of the plunger 41 by reaction against a shoulder 62 which terminates the reduced portion 60. This will unseat the face of the plunger from the shoulder 61 and admit oil under pressure to exert itself against the area of the plunger in the manner hereinbefore described where it will balance the action of the spring 44 and become effective to control the quantity of oil flowing to the pump through its intake passage.

We claim:

1. A motor lubrication system comprising a pump having an intake passage in communication with a reservoir and a discharge passage for directing lubricant to bearing surfaces, a pressure regulated control valve for restricting lubricant flow through the intake passage, and means for communicating regulating pressure to said control valve from the discharge side of the pump.

2. A motor lubrication system comprising a pump having an intake passage in communication with a reservoir and a discharge passage for directing lubricant to bearing surfaces, a pressure regulated control valve for restricting lubricant flow through the intake passage, and means for communicating regulating pressure to said control valve from the discharge side of the pump and from a point adjacent to said bearing surfaces.

3. A motor lubrication system comprising a pump, conduits leading from the discharge side of said pump to bearings to be lubricated, a reservoir for lubricant, a conduit between said reservoir and the intake of said pump, a valve in said intake conduit arranged to restrict the flow of lubricant to the pump, a spring urging said valve to open position, a pressure responsive plunger for closing the valve, and means for directing pressure from said discharge conduits to said plunger whereby the intake capacity of the pump will be regulated by its discharge pressure.

4. In a system for directing lubricant to bearings or the like, a source of lubricant, a pump having an intake communicating with said source, means communicating the discharge of the pump with the bearings, pressure controlled valve means to restrict the flow of lubricant to the pump intake, and means to communicate pressure from between the pump and the bearings to the valve means to control the quantity of lubricant being pumped.

GEORGE E. BURKS.
RONALD R. ROBINSON.

REFERENCES CITED

The following references are of record in the file of this patent:

UNITED STATES PATENTS

| Number | Name | Date |
|---|---|---|
| 822,276 | Hodsdon | June 5, 1906 |
| 1,288,302 | Vincent | Dec. 17, 1918 |
| 2,138,969 | Hobbs | Dec. 6, 1938 |
| 2,192,989 | Trigg | Mar. 12, 1940 |
| 2,298,646 | Ovens | Oct. 13, 1942 |
| 2,312,063 | Allen | Feb. 23, 1943 |
| 2,443,143 | Madsen | June 8, 1948 |

FOREIGN PATENTS

| Number | Country | Date |
|---|---|---|
| 496,536 | France | Aug. 6, 1919 |